Aug. 14, 1962   M. A. POLSTER   3,049,008
WIND INDICATORS FOR VESSELS
Filed Feb. 2, 1959   2 Sheets-Sheet 1

INVENTOR.
Morton A. Polster
BY

INVENTOR.
Morton A. Polster

# United States Patent Office 3,049,008
Patented Aug. 14, 1962

3,049,008
WIND INDICATORS FOR VESSELS
Morton Arnold Polster, 96 Wildmere Road,
Rochester, N.Y.
Filed Feb. 2, 1959, Ser. No. 790,741
7 Claims. (Cl. 73—188)

This invention relates to wind indicators, and, more particularly, to wind indicators for sailboats.

When sailing, in order to maintain maximum efficiency, the setting of the sails must be varied in accordance with the direction of the relative wind acting upon the boat at any given instant. (The relative wind acting upon a particular boat at any given instant is a resultant vector, the vector sum of the direction and velocity of the true wind plus or minus the course and speed of the boat.) Therefore, it is essential that the person or persons operating a sail boat have some way of determining the relative wind at all times.

Presently, relative wind is indicated by flags, vanes mounted at the top of masts, and "tell-tales"—thin strips of light cloth hung from the shrouds. None of these methods is particularly satisfactory. The flags and "tell-tales" flutter, tear easily, and tend to become fouled around the shrouds, while the mast-head vanes are difficult to read due to the height of the mast. And, what is more important, the mast-head vanes and flags give improper relative wind indications due to the heeling of the boat from the vertical plane, and due to the fact that the velocity of the true wind increases directly with the distance above the surface of the water. As the result of this last stated fact, the relative wind indicated at a mast-head differs appreciably from the relative wind striking the center of the sail, and sails set according to a mast-head wind indicator will not be trimmed for maximum efficiency.

It is the purpose of this invention to overcome the inaccuracies and inefficiencies being encountered with wind indicators presently used on sailing vessels. The relative wind indicator described herein is designed to be attached to the shrouds or other standing rigging of a sailboat at a point level with the center of the mainsail area. The rigid vane of the indicator, counter-balanced to increase sensitivity and to lessen wear on its bearing, is designed to point into the mainsail in the direction of the relative wind, and the counterweight is color coded to aid visual angle differentiation. The vane unit is mounted on a weighted pendulum shaft which is pinned by a bearing to a support bracket. The design of the support bracket is such that the weighted pendulum shaft is free to pivot on the bracket bearings and thus remain upright at all angles of heel. The vane unit of the indicator is attached to the weighted pendulum shaft by bearings and freely turns on the shaft with the force of the wind, while the pendulum shaft weight is also pinned to the shaft in pendulum fashion to damp oscillations. By virtue of this novel structure, the vane of the indicator does not flutter in the wind nor does it oscillate with the pitching of the boat: it remains in a plane vertical to the surface of the water and gives steady indications of the the directions of the relative wind.

One of the objects of this invention is to provide an accurate wind indicator for sailboats which is not subject to fluttering nor to fouling in the shrouds of a boat.

Another object of this invention is to provide an accurate relative wind indicator of permanent nature for use on vessels.

Another object of this invention is to provide a wind indicator which will accurately indicate the relative wind acting upon the major portion of a boat's sail area.

Another object of this invention is to provide a relative wind indicator which will give accurate indications when a boat is heeling over while under sail.

Another object of this invention is to provide a pendulum support for a vane which, while permitting the vane to remain in a vertical plane, has self-damping features to prevent unwanted oscillations.

Another object of this invention is to provide a relative wind indicator which can be easily read and with which equal but opposite angles of deflection may be easily differentiated.

Other objects, purposes and characteristic features of this invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIG. 1 is a perspective drawing of one form of the entire relative wind indicator assembly;

FIGS. 2A and 2B are two views of a cross-section of the indicator taken along line A—A' in FIG. 1 with parts omitted for clarity and viewed in the direction of the arrows. FIG. 2A shows the relative position of the pendulum shaft and support bracket when the boat to which the indicator is attached is sailing on an even keel, while FIG. 2B shows the relative position of these same parts when the boat is heeling under sail;

Figure 1:
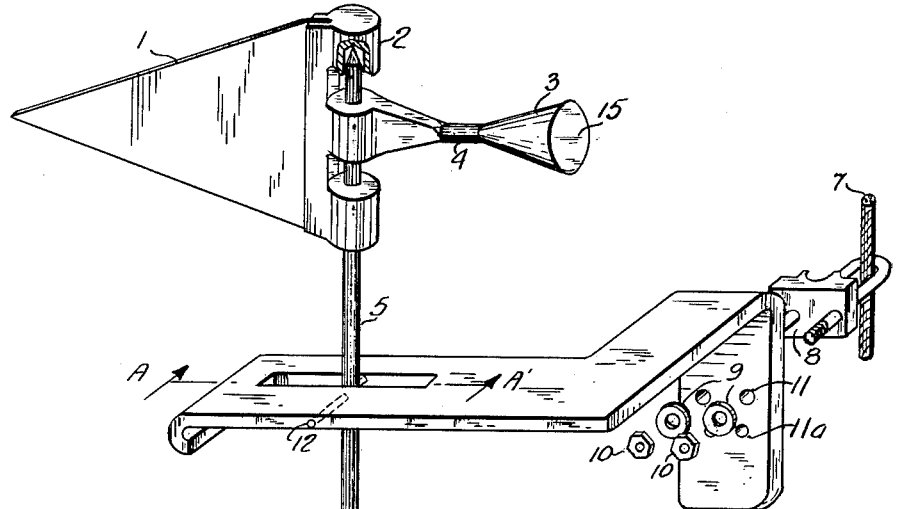

Referring now to FIG. 1, the triangularly shaped vane 1 is securely attached to vane unit bearing 2. (The suggested material for the vane 1 is a light, rigid but flexible plastic, such as rigid vinyl, while nylon is suggested for the vane unit bearing 2.) Counter-weight 3 is also securely attached to vane unit bearing 2 by means of connecting arm 4 so that vane 1 and counter-weight 3 are in the same plane. Vane unit bearing 2 rides freely on weighted pendulum shaft 5, permitting the entire vane unit to rotate freely around weighted pendulum shaft 5.

It should be noted that the weight of counterweight 3 and the length of connecting arm 4 should be such that the entire vane unit balances along the axis of weighted pendulum shaft 5. This is necessary to increase the responsiveness of the vane and, incidentally, to reduce wear on vane unit bearing 2.

Support bracket 6 is firmly attached to the standing rigging of a vessel. In the form illustrated in FIG. 1, support bracket 6 is adapted to be attached to a shroud of a sail boat by means of U-bolt 7, cable clamp 8, lock washers 9 and nuts 10, the shroud passing between U-bolt 7 and cable clamp 8. Another set of holes 11a are provided for use with a smaller cable clamp unit for boats having shrouds of lesser diameter.

Weighted pendulum shaft 5 passes through a slot in support bracket 6 and is fastened to support bracket 6 by means of pin bearing 12. The slot is just wide enough to permit the passage of weighted pendulum shaft 5 which is pinned at some point substantially above its center of gravity. For this purpose, the center of gravity of weighted pendulum shaft 5 is calculated to include the weight of the balanced vane unit as well as that of pendulum shaft weight 13.

Figure 4:
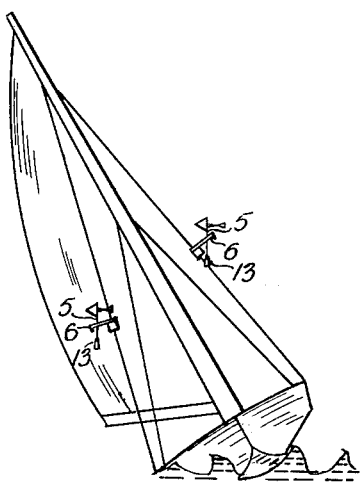
FIG. 4 shows two of the indicators as they might appear attached to the shrouds of a sailboat heeling on a close reach.

To facilitate description of the operation of the indicator, attention is now called to FIG. 4, which shows two indicators of the form illustrated in FIG. 1 attached to the shrouds of a sailing vessel heeling on a close reach. It can be seen that support bracket 6, which is rigidly attached to the standing rigging, follows the motion of the vessel and maintains its position relative to it. However, the balanced vane unit, by virtue of its support on weighted pendulum shaft 5, does not follow the heel of the vessel but is maintained in a vertical plane.

Figure 2A:
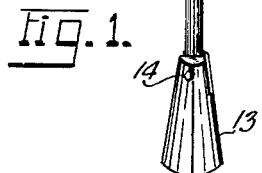
Figure 2B:
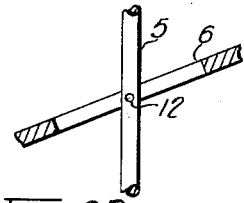

The pivoting of weighted pendulum shaft 5 in relation to support bracket 6 is illustrated by FIGS. 2A and 2B which are two views of a cross-section of FIG. 1 taken on line A—A' viewed in the direction of the arrows. In FIG. 2A, it is assumed that the vessel is sailing on an even keel, while FIG. 2B assumes that the vessel is heeling in a manner such as that illustrated in FIG. 4.

Thus, although the vessel to which it is attached heels in varying degrees to one side or the other, the indicator vane remains in a vertical plane, its angle of deflection in response to the relative wind remaining unaffected by the vessel's heel.

It should be noted that this time that while the invention described herein encompasses a completely free-swinging pendulum, such as one supported on gimbals, the preferred forms of the invention illustrated in the accompanying drawings show the pendulum shaft with its weight inhibited in the fore-and-aft plane. The purpose of this restriction is to prevent the pendulum from setting up undesirable oscillations as the result of the pitching motion of the vessel. This restriction permits the pendulum shaft to swing freely only in a plane normal to the fore-and-aft plane of the vessel, increasing the stability of the vane and adding to its accuracy and readibility.

As a further method of increasing the stability of the indicator, in the preferred form pendulum shaft weight 13 is connected to the end of pendulum shaft 5 by means of bearing pin 14 which exactly parallels pin bearing 12. This permits pendulum shaft weight 13 to rotate freely around bearing pin 14 in exactly the same plane in which pendulum shaft 5 is free to rotate as explained above. As the result of this, any harmonic motion that begins to develop in weighted pendulum shaft 5 is damped by the simultaneous harmonic motion of the much shorter pendulum created by the swinging of pendulum shaft weight 13 around bearing pin 14.

To assure this damping effect, it is necessary that pendulum shaft weight 13 have sufficient mass to cause the center of gravity of the entire pendulum unit to be located within shaft weight 13 itself. The time for each period of harmonic motion of a given pendulum is directly proportional to the distance between its pivotal point and its center of gravity. Thus, the frequency of oscillation of the much shorter pendulum created by the motion of pendulum shaft weight 13 around bearing pin 14 is far greater than the frequency of oscillation of the entire pendulum unit. Since these different harmonic frequencies are applied simultaneously to weighted pendulum shaft 5, they tend to cancel out, supplying the desired damping effect.

Figure 3A:
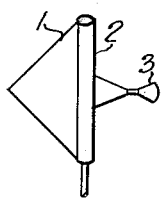
FIGS. 3A and 3B illustrate the result obtained by color coding the counter-balancing weight of the vane unit, showing the vane unit indicating equal but opposite angles of deflection.
Figure 3B:
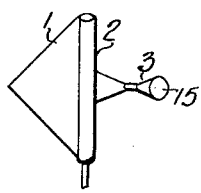

To facilitate "reading" the indicator, counter-weight 3 is constructed with one major surface 15 in a plane normal to the plane of the major surfaces of vane 1. Major surface 15 is color coded with a bright color markedly different from all the other surfaces of counter-weight 3. The effect of this color coding is illustrated in FIGS. 3A and 3B wherein the balanced vane unit is shown making equal but opposite angles with the plane of the paper. The contrasting color of surface 15 of counter-weight 3 makes it possible to differentiate readily the two angles indicated, greatly facilitating the readibility of the indicator.

Figure 5:
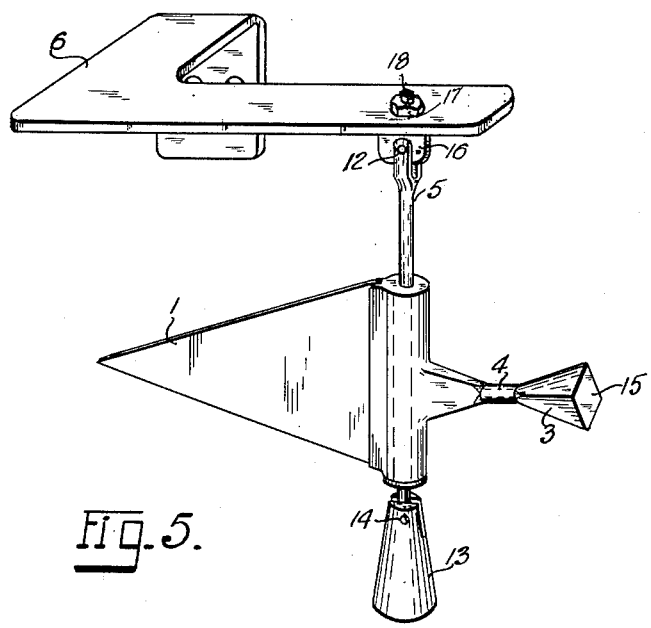
FIGS. 5 and 6 illustrate two other forms of the invention with minor parts omitted.
Figure 6:
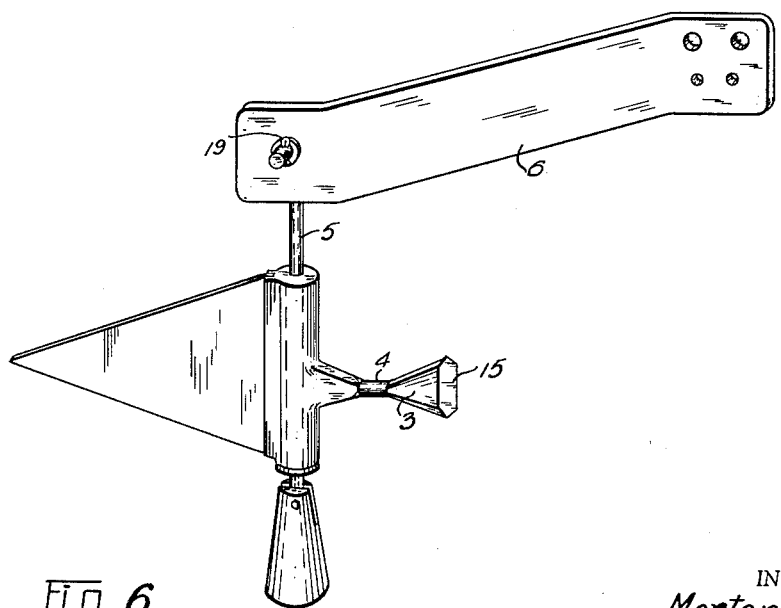

FIGS. 5 and 6 illustrate alternative forms of the invention, in both of which the weighted pendulum shaft 5 is pivoted at one end rather than at an intermediate point, and the balanced vane unit is suspended below support bracket 6.

In FIG. 5, bearing support 16 receives the bifurcated end of weighted pendulum shaft 5, the two being connected by means of bearing pin 12 so that weighted pendulum shaft 5 can freely pivot in the manner described above. After the entire indicator assembly has been mounted on a boat, bearing support 16 can be adjusted by loosening nut 17 and changing the position of bolt 18 to permit accurate alignment of pendulum motion in a plane normal to the fore-and-aft plane of the boat.

In FIG. 6, weighted pendulum shaft 5 has been bent at a right angle at its upper end and is received through a hole in support bracket 6. Cotter pin 19 secures the bent portion of weighted pendulum shaft 5 which acts as its own bearing pin, permitting the pendulum motion described above.

In any of the many forms this invention may assume, it is suggested that all parts be manufactured from non-corrosive materials to assure long life for the entire assembly in spite of constant exposure to the weather, and, more particularly, to the sea air and spray.

Having described three specific embodiments of the present invention, it should be understood that these forms are selected to facilitate in the disclosure of the invention rather than to limit the number of forms which it may assume; and, it should be further understood that various modifications, adaptations and alterations may be applied to the specific forms shown to meet the requirements of practice, without in any manner departing from the spirit or the scope of the present invention.

What I claim is:

1. A relative wind indicator comprising, a vane, a support bracket adapted to be secured to a fixed support, said support bracket having a bearing, a weight, and a pendulum shaft having said weight pivotally attached to one end thereof to permit said weight to swing freely in at least one plane and having a bearing adapted to receive said vane and to permit said vane to rotate freely about said weighted pendulum shaft, said weighted pendulum shaft being pivoted in said bearing of said support bracket to permit said weighted pendulum shaft to assume a vertical position when at rest and to permit movement of said weighted pendulum shaft in at least one plane normal to the plane of rotation of said vane.

2. A relative wind indicator comprising, a pendulum shaft having a weight pivotally attached to one end thereof to permit said weight to swing freely in at least one plane, a support bracket adapted to be fastened to the standing rigging of a vessel, said support bracket being adapted to support said weighted pendulum shaft in a vertical position when at rest and to permit said weighted pendulum shaft to pivot freely in at least one plane, a balanced vane unit consisting of a vane with a bearing member attached to one edge and a counter-balancing member attached to said bearing member for causing the center of gravity of said balanced vane unit to be aligned with said bearing member, said bearing member being adapted to receive said weighted pendulum shaft and to allow said balanced vane unit to rotate freely around said weighted pendulum shaft.

3. A relative wind indicator comprising, a counter-balanced vane rotatably mounted on a weighted pendulum shaft, said weighted pendulum shaft having a weight attached to one end thereof by means of a bearing to permit said weight to move pendulum fashion in at least one plane, a support bracket having a bearing adapted to receive said weighted pendulum shaft to permit said weighted pendulum shaft to assume a vertical position when at rest and to permit movement of said weighted pendulum shaft in at least one plane normal to the plane of rotation of said counter-balanced vane, said support bracket being adapted to be secured to a fixed support.

4. A relative wind indicator comprising, a vane pivotally mounted to enable the wind to cause its rotation about an axis fixed in relation to said vane, and a counter-balancing member attached to said vane, said counter-balancing member having at least one major surface in a plane parallel to said axis of rotation of said vane and normal to the major surfaces of said vane, said major surface of said counter-balancing member being colored noticeably different from the other surfaces of said counter-balancing member.

5. A relative wind indicator comprising, a shaft with a weight attached pendulum fashion to one end thereof permitting said weight to swing freely in one plane, a vane rotatably mounted on said shaft and counter-balanced by a counter-weight having one major surface in a plane normal to the plane of said vane, said major surface of said counter-weight being colored distinctively different from all other surfaces of said counter-weight, and a support bracket adapted to be attached to the standing rigging of a vessel and having a bearing adapted to receive said shaft at a point intermediate its said weighted end and said vane, said shaft being pivoted pendulum fashion in said bearing of said support bracket to permit said weighted pendulum shaft to assume a vertical position when at rest and to permit movement of said shaft in said plane of swing of said weight, said plane of swing being normal to the plane of rotation of said vane.

6. A relative wind indicator comprising, a shaft bifurcated at one end with a weight attached to the other end thereof in pendulum fashion permitting said weight to swing freely in one plane, a vane rotatably mounted on said shaft and counter-balanced by a counter-weight, said counter-weight having one large surface of a distinctively different color in a plane normal to the major surfaces of said vane, and a support bracket having a bearing adapted to receive the bifurcated end of said shaft to permit said shaft to swing freely in said plane of swing of said weight, said support bracket also being adapted to be attached to the standing rigging of a vessel.

7. A relative wind indicator comprising, a vane counter-balanced by a counter-weight with a large surface normal to the plane of said vane and distinctively colored, said vane being rotatably mounted on a shaft having one end bent at a right angle to itself, said shaft also having a weight suspended pendulum fashion from its other end by means of a bearing which permits said weight to swing freely in a plane normal to the plane of said bent end of said shaft, and a support bracket adapted to be mounted on the standing rigging of a vessel and having a bearing adapted to receive said bent end of said shaft to permit said shaft to swing freely in said plane of swing of said weight.

References Cited in the file of this patent
UNITED STATES PATENTS

| | | |
|---|---|---|
| 989,958 | Frahm | Apr. 18, 1911 |
| 2,266,172 | Davis | Dec. 16, 1941 |
| 2,681,569 | Hirschoff | June 22, 1954 |